US011268713B2

(12) United States Patent
Kwon et al.

(10) Patent No.: US 11,268,713 B2
(45) Date of Patent: Mar. 8, 2022

(54) SMART HOME AIR CONDITIONER AUTOMATIC CONTROL SYSTEM BASED ON ARTIFICIAL INTELLIGENCE

(71) Applicant: KOREA ELECTRONICS TECHNOLOGY INSTITUTE, Seongnam-si (KR)

(72) Inventors: Ki Woong Kwon, Seoul (KR); Sang Hak Lee, Seongnam-si (KR); Jung Mee Yun, Seongnam-si (KR); Sang Hun Kim, Suwon-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 90 days.

(21) Appl. No.: 16/426,008

(22) Filed: May 30, 2019

(65) Prior Publication Data

US 2020/0200414 A1 Jun. 25, 2020

(30) Foreign Application Priority Data

Dec. 20, 2018 (KR) .......................... 10-2018-0165902

(51) Int. Cl.
*F24F 11/30* (2018.01)
*F24F 11/00* (2018.01)
(Continued)

(52) U.S. Cl.
CPC .......... *F24F 11/30* (2018.01); *F24F 11/0008* (2013.01); *F24F 11/58* (2018.01);
(Continued)

(58) Field of Classification Search
CPC ........ F24F 11/30; F24F 11/0008; F24F 11/58; F24F 11/64; F24F 11/65; F24F 2221/38;
(Continued)

(56) References Cited

U.S. PATENT DOCUMENTS

2002/0027553 A1* 3/2002 Lindholm ............... G06T 11/40
                                                              345/426
2012/0072031 A1* 3/2012 Elliott ................ G05D 23/1921
                                                              700/277
(Continued)

FOREIGN PATENT DOCUMENTS

JP            2011-7359 A      1/2011
KR       10-1757446 B1        7/2017

OTHER PUBLICATIONS

Korean Office Action for corresponding Korean application No. 10-2018-0165902 dated Jun. 29, 2020.

*Primary Examiner* — Mohammad Ali
*Assistant Examiner* — Sheela Rao
(74) *Attorney, Agent, or Firm* — Hauptman Ham, LLP

(57) ABSTRACT

There are provided an air conditioner automatic control method, an air conditioner automatic control apparatus, a recording medium, and an air conditioner. The air conditioner automatic control method receives occupancy detection data indicating whether a user occupies a room, receives temperature data and humidity data indicating indoor temperature and humidity, predicts future occupancy probability information of the user by using the occupancy detection data, derives an optimal PMV by using the temperature data and the humidity data, and calculates an optimal temperature by using the optimal PMV, and controls the air conditioner based on the occupancy detection data, the future occupancy probability, and the optimal temperature. Accordingly, the air conditioner can be driven at the optimal temperature suitable for the user.

9 Claims, 9 Drawing Sheets

(51) Int. Cl.
*F24F 11/58* (2018.01)
*F24F 11/64* (2018.01)
*F24F 11/65* (2018.01)
*G05B 13/02* (2006.01)
*G05B 13/04* (2006.01)
*F24F 110/10* (2018.01)
*F24F 110/20* (2018.01)
*F24F 120/12* (2018.01)
*F24F 120/20* (2018.01)

(52) U.S. Cl.
CPC .............. *F24F 11/64* (2018.01); *F24F 11/65* (2018.01); *G05B 13/0265* (2013.01); *G05B 13/048* (2013.01); *F24F 2110/10* (2018.01); *F24F 2110/20* (2018.01); *F24F 2120/12* (2018.01); *F24F 2120/20* (2018.01); *F24F 2221/38* (2013.01)

(58) Field of Classification Search
CPC .............. F24F 2110/10; F24F 2110/20; F24F 2120/12; F24F 2120/20; F24F 11/46; F24F 2120/10; G05B 13/0265; G05B 13/048; G05B 2219/2614; G05B 15/02; G06N 3/08
See application file for complete search history.

(56) References Cited

U.S. PATENT DOCUMENTS

2018/0322405 A1* 11/2018 Fadell ..................... H04W 4/80
2019/0158305 A1* 5/2019 Cui ......................... F24F 11/54

* cited by examiner

SMART HOME AIR CONDITIONER AUTOMATIC CONTROL SYSTEM BASED ON ARTIFICIAL INTELLIGENCE

CROSS-REFERENCE TO RELATED APPLICATION(S) AND CLAIM OF PRIORITY

This application is based on and claims priority under 35 U.S.C. § 119 to Korean Patent Application No. 10-2018-0165902, filed on Dec. 20, 2018, in the Korean Intellectual Property Office, the disclosure of which is herein incorporated by reference in its entirety.

BACKGROUND

Field

The present disclosure relates generally to an air conditioner automatic control method and apparatus, and more particularly, to an air conditioner automatic control method and apparatus for operating an air conditioner at an optimal temperature.

Description of Related Art

The information disclosed herein is presented as background information only to assist with an understanding of embodiments, and is not applicable as prior art.

An air conditioner refers to an apparatus that cools indoors or purifies the air indoors to provide a better indoor environment to a user.

In recent years, artificial intelligence (AI)-based air conditioners have developed, and environments where users can use air conditioners more easily are established.

However, a related-art AI-based air conditioner control system calculates an estimated optimal temperature mainly based on temperature data. However, not only temperature but also other factors influence user comfort.

In addition, since comfort that all users feel varies according to an individual, there is a problem that it is difficult to reflect user's unique characteristics in the operation of an air conditioner.

Accordingly, there is a demand for a method for controlling an air conditioner to operate at an optimal temperature suitable for an individual.

SUMMARY

To address the above-discussed deficiencies of the prior art, it is a primary object of the present disclosure to provide an air conditioner automatic control method, an air conditioner automatic control apparatus, a recording medium, and an air conditioner, which receive occupancy detection data indicating whether a user occupies a room, receive temperature data and humidity data indicating indoor temperature and humidity, predict future occupancy probability information of the user by using the occupancy detection data, derive an optimal Predicted Mean Vote (PMV) by using the temperature data and the humidity data, and calculate an optimal temperature by using the optimal PMV, and control the air conditioner based on the occupancy detection data, the future occupancy probability, and the optimal temperature.

The technical objects that can be achieved by the present disclosure are not limited to those mentioned in the above, and other technical objects that are not mentioned herein could be clearly understood by a person skilled in the art based on the following descriptions.

According to an embodiment of the present disclosure to achieve the above-described object, a method for automatically controlling an air conditioner by an air conditioner automatic control apparatus includes: receiving occupancy detection data indicating whether a user occupies a room; receiving temperature data and humidity data indicating indoor temperature and humidity; predicting future occupancy probability information of the user by using the occupancy detection data; deriving an optimal PMV by using the temperature data and the humidity data, and calculating an optimal temperature by using the optimal PMV; and controlling the air conditioner based on the occupancy detection data, the future occupancy probability, and the optimal temperature.

In addition, the controlling may include: when the occupancy detection data indicates an inoccupancy state and the future occupancy probability information indicates an occupancy state after a predetermined time, controlling an operation of the air conditioner to be driven; and, when the future occupancy probability information indicates an inoccupancy state after a predetermined time, controlling the operation of the air conditioner to be stopped.

In addition, the controlling may include, when the occupancy detection data indicates an occupancy state and the future occupancy probability information indicates an inoccupancy state after a predetermined time, controlling an operation of the air conditioner to be stopped.

In addition, the controlling may include, when the occupancy detection data indicates an occupancy state and the future occupancy probability information indicates an occupancy state after a predetermined time, controlling an operation of the air conditioner to be driven.

In addition, the controlling may include: when the air conditioner is set to a first mode, controlling the air conditioner to be set to the optimal temperature and to operate; when the air conditioner is set to a second mode, controlling the air conditioner to be set to a temperature higher than the optimal temperature by 1 degree, and to operate; and, when the air conditioner is set to a third mode, controlling the air conditioner to be set to a temperature higher than the optimal temperature by 2 degrees, and to operate.

In addition, the predicting may include predicting the future occupancy probability information by clustering corresponding occupancy detection data by days of the week and time by using occupancy detection data of a past predetermined period.

In addition, the calculating the optimal temperature may include generating a learning model for deriving an optimal PMV by learning temperature data and humidity data of a past predetermined period through an AI neutral network, and calculating the optimal temperature based on the optimal PMV derived by using the generated learning model.

In addition, the calculating the optimal temperature may include learning only temperature data and humidity data of the time that the occupancy detection data indicates an occupancy state, from among the temperature data and the humidity data of the past predetermined period, through the AI neural network.

In addition, the calculating the optimal temperature may include converting time data regarding the temperature data and the humidity data of the past predetermined period from a scalar into a direction vector, and using the time data as input data for the AI neural network.

According to an embodiment of the present disclosure, a computer-readable recording medium has a computer program recorded thereon, the computer program performing a method for automatically controlling an air conditioner by an air conditioner automatic control apparatus, the method including: receiving occupancy detection data indicating whether a user occupies a room; receiving temperature data and humidity data indicating indoor temperature and humidity; predicting future occupancy probability information of the user by using the occupancy detection data; deriving an optimal PMV by using the temperature data and the humidity data, and calculating an optimal temperature by using the optimal PMV; and controlling the air conditioner based on the occupancy detection data, the future occupancy probability, and the optimal temperature.

According to an embodiment, an air conditioner automatic control apparatus includes: a communication unit configured to receive occupancy detection data indicating whether a user occupies a room, and to receive temperature data and humidity data indicating indoor temperature and humidity; and a controller configured to predict future occupancy probability information of the user by using the occupancy detection data, to derive an optimal PMV by using the temperature data and the humidity data, and to calculate an optimal temperature by using the optimal PMV, and to control an air conditioner based on the occupancy detection data, the future occupancy probability, and the optimal temperature.

According to an embodiment of the present disclosure, an air conditioner includes a sensor unit configured to detect occupancy detection data indicating whether a user occupies a room, and to detect temperature data and humidity data indicating indoor temperature and humidity; and a controller configured to predict future occupancy probability information of a user by using the occupancy detection data, to derive an optimal PMV by using the temperature data and the humidity data, and to calculate an optimal temperature by using the optimal PMV, and to control the air conditioner to operate based on the occupancy detection data, the future occupancy probability, and the optimal temperature.

According to various embodiments of the present disclosure, there are provided an air conditioner automatic control method, an air conditioner automatic control apparatus, a recording medium, and an air conditioner, which receive occupancy detection data indicating whether a user occupies a room, receive temperature data and humidity data indicating indoor temperature and humidity, predict future occupancy probability information of the user by using the occupancy detection data, derive an optimal PMV by using the temperature data and the humidity data, and calculate an optimal temperature by using the optimal PMV, and control the air conditioner based on the occupancy detection data, the future occupancy probability, and the optimal temperature. Accordingly, the air conditioner can be driven at the optimal temperature suitable for the user.

The effects that can be achieved by the present disclosure are not limited to those mentioned in the above, and other effects that are not mentioned herein could be clearly understood by a person skilled in the art based on the following descriptions.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
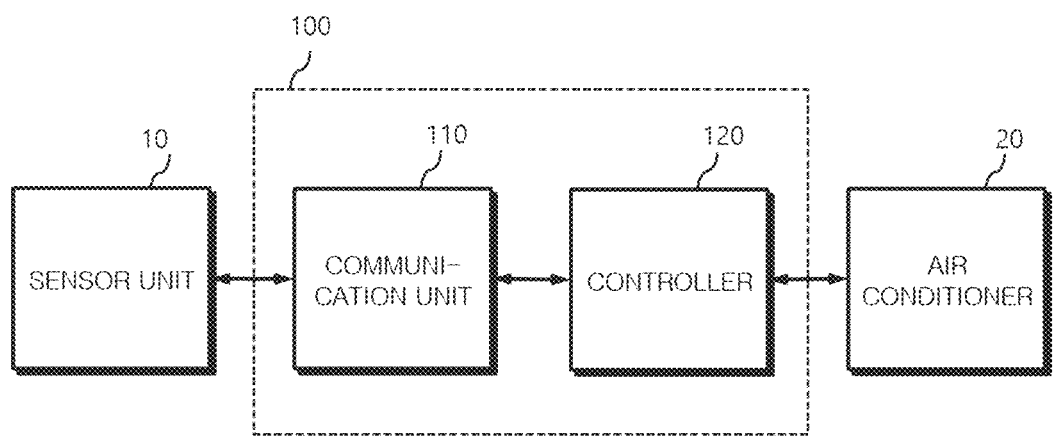
FIG. 1 is a view illustrating a configuration of an air conditioner automatic control apparatus according to an embodiment of the present disclosure.

The present disclosure will now be described more fully with reference to specific embodiments of the present disclosure illustrated in the accompanying drawings to clarify features and advantages of the present disclosure.

In the following description and the accompanying drawings, well-known functions or constructions are not described in detail since they would obscure the invention in unnecessary detail. In addition, it should be noted that, throughout the drawings, the same reference numerals are used for the same elements if possible.

Terms or words used in the following description and drawings should not be interpreted as being limited to general and dictionary definition, and should be interpreted as having definitions and concepts suitable for the technical idea of the present disclosure, based on the principle that the inventors can appropriately define the terms as concepts for explaining their invention in the best method.

Accordingly, the constructions illustrated in the embodiments of the detailed description and the drawings are merely the most preferred embodiment of the present disclosure, and do not represent all technical ideas of the present disclosure. Therefore, the embodiments should be construed as including various equivalents and variations substituted therefor at the time of filing.

The terms such as "first" or "second" used in various embodiments may be used to explain various elements and to distinguish one element from another element, but do not limit the elements. For example, without departing the scope of the present disclosure, a second element may be referred to as a first element, and similarly, a first element may be referred to as a second element.

It will be understood that when an element is referred to as being "coupled to" or "connected to" another element, it can be logically or physically coupled or connected to another element.

In other words, an element may be directly coupled or connected to another element, but there may be an intervening element therebetween or the element may be indirectly coupled or connected to another element.

The terms "include" or "have" used in the detailed description indicate the presence of features, numbers, steps, operations, elements, components or a combination thereof described in the detailed description, and do not preclude the presence or addition of one or more other features, numbers, steps, operations, elements, components, or a combination thereof.

The terms "unit" and "module" and the terms having suffix "-er" or "-or" used in the detailed description refer to a unit for processing at least one function or operation, and may be implemented by hardware, software, or a combination of hardware and software.

As used herein, the terms "a", "one," "the," and similar terms thereto are intended to include the singular forms and the plural forms, unless the context describing the present disclosure (in particular, the context of claims presented below) clearly indicates otherwise.

Hereinafter, the present disclosure will be described in detail with reference to the accompanying drawings.

FIG. 1 is a view illustrating a configuration of an air conditioner automatic control apparatus 100 according to an embodiment of the present disclosure.

The air conditioner automatic control apparatus 100 shown in FIG. 1 may be connected with a sensor unit 10 and an air conditioner 20 through wired or wireless communication to communicate therewith, and may receive environment information including temperature data and humidity data, which are detected by one or more sensor units 10, and occupancy detection data regarding whether a user occupies a room, and may control the air conditioner 20 by using the data. An apparatus for automatically controlling an air conditioner is named the air conditioner automatic control apparatus 100, but is not limited to a specific apparatus. Any apparatus that controls the air conditioner, such as a server or a normal personal computer (PC), may be applied as the air conditioner automatic control apparatus 100. As shown in FIG. 1, the air conditioner automatic control apparatus 100 includes a communication unit 110 and a controller 120.

The communication unit 110 communicates with the sensor unit 10 and the air conditioner 20 wiredly or wirelessly. The communication unit 110 may receive occupancy detection data indicating whether the user occupies the room from the sensor unit 10, and may receive temperature data and humidity data indicating indoor temperature and humidity.

Herein, the occupancy detection data may be data indicating whether the user occupies the room (occupancy state) or leaves the room (inoccupancy state), and tier example, the occupancy state may be displayed as 1, and the inoccupancy state may be displayed as 0. To detect the occupancy detection data, the sensor unit 10 may include a passive infrared (PIR) operation detection sensor or a human body detection motion sensor.

In addition, the temperature data and the humidity data may be data indicating an indoor temperature value and a humidity value. To detect the temperature data and the humidity data, the sensor unit 10 may include a temperature sensor and a humidity sensor.

The controller 120 controls an overall operation of the air conditioner automatic control apparatus 100. Specifically, the controller 120 may predict future occupancy probability information of the user by using the occupancy detection data, may derive an optimal predicted mean vote (PMV) by using the temperature data and the humidity data, and may calculate an optimal temperature by using the optimal PMV, and may control the air conditioner based on the occupancy detection data, the future occupancy probability, and the optimal temperature. Accordingly, the controller 120 controls the operation of the air conditioner 20.

The future occupancy probability information may be information indicating whether the user is expected to be in the occupancy state or the inoccupancy state after a predetermined time. For example, when the user is expected to be in the occupancy state, the corresponding information may be displayed as 1, and, when the user is expected to be in the inoccupancy state, the corresponding information may be displayed as 0.

In this case, the controller 120 may predict the future occupancy probability information by clustering corresponding occupancy detection data by days of the week and time by using occupancy detection data of a past predetermined period.

Specifically, the controller 120 may extract occupancy detection data of recent 30 days from a database server to predict the future occupancy probability information, and may predict the future occupancy probability information by using the extracted data. When predicting the future occupancy probability information, the controller 120 may cluster the occupancy detection data of 30 days by days of the week, and may extract a day cluster showing similar occupancy patterns. The controller 120 applies a future occupancy probability information prediction model differently according to the classified day cluster, such that it is possible to prevent the same occupancy prediction results from being always obtained from the days showing different occupancy patterns.

If a set of data for clustering is defined as $S=\{s_1, s_2, \ldots, s_k\}$, the aim is to find S satisfying the following condition regarding a center point $\mu_i$ of the corresponding set:

$$\arg\min_S \sum_{i=1}^{k} \sum_{x \in S_i} \|x - \mu_i\|^2$$

The controller 120 may cluster occupancy patterns by programming a divide and conquer technique to find a minimum value of the objective function.

In addition, the controller 120 obtains an occupancy probability regarding an individual cluster after clustering the occupancy detection data. In this case, since the occupancy detection data is discrete time data having values 0 and 1, and includes only a limited observation value, the controller 120 may use a density estimation technique to obtain a more reasonable probability value. When nonparametric kernel density estimation is applied from among the density estimation techniques, the following equation may be used:

$$\hat{f}_h(x) = \frac{1}{n}\sum_{i=1}^{n} K_h(x - x_i) = \frac{1}{nh}\sum_{i=1}^{n} K\left(\frac{x - x_i}{h}\right)$$

Herein, h indicates a Kernel bandwidth, and, when a Gaussian kernel function is used, an optimal h value may be expressed as follows:

$$h = \left\{4\frac{\sigma^5}{3n}\right\}^{\frac{1}{5}} \approx 1.06\sigma n^{-1/5}$$

where n is the number of data samples, and σ is a standard deviation.

The controller 120 may extract a day cluster showing similar occupancy patterns through clustering and kernel density estimation, and may predict more exact future occupancy probability information by expressing discrete data as a probability value.

The PMV is a numerical value indicating thermal comfort in an indoor environment, and indicates a predicted average sensation about how a user feels cool or warm. That is, the PMV is a numerical value indicating a value for classifying people's thermal sensation, and ranges from −3 (cold) to +3 (hot). If the PMV is 0, it indicates a very comfortable state, and indicates a case in which 95% of occupants feel comfortable, and also indicates that there is no dissatisfaction with the cold or heat. Subjective rating of thermal comfort by the PMV may be performed by using a sematic differential scale of 7 or 10 levels, and the scale may include the following levels:

cold −3
cool −2
slightly cool −1
neutral 0
slightly warm +1
warm +2
hot +3

The controller 120 may calculate the PMV by using Equation 1 presented below:

$$PMV=[0.303e^{-0.036M}+0.028]\{(M-W)-3.96E^{-8}f_{cl}[(t_{cl}+273)^4]-f_{cl}h_c(t_{cl}-t_a)-3.05[5.73-0.007(M-W)-p_a]-0.42[(M-W)-58.15], -0.0173M(5.87-p_a)-0.0014M(34-t_a)\}$$ Equation 1

$$f_{cl}=1.0+0.2I_{cl}$$

$$f_{cl}=1.05+0.1I_{cl}$$

$$t_{cl}=35.7-0.0275(M-W)-R_{cl}\{(M-W)-3.05[5.73-0.007(M-W)-p_a]-0.42[(M-W)-58.15]-0.0173M(5.87-p_a)-0.00014M(34-t_a)\}$$

$$R_{cl}=0.155I_{cl}$$

$$h_c=12.1(V)^{1/2}$$

where e is Euler's number, $f_{cl}$ is clothing factor, $h_c$ is heat transfer coefficient, $I_{cl}$ is clothing insulation, M is metabolic rate, W is external work, $p_a$ is vapor pressure of air, $R_{cl}$ is clothing thermal insulation, $t_a$ is air temperature, $t_{cl}$ is surface temperature of clothing, $t_r$ is mean radiant temperature, and V is air velocity.

Since it is difficult to measure real values of clothing thermal insulation, metabolic rate, or the like, the controller 120 may substitute these values with reasonable constant values, and may generate the PMV by using temperature data and humidity data.

Even if the PMV is 0, all people do not feel most comfortable. Therefore, characteristics of each user may not be reflected simply by setting the PMV to 0. Accordingly, even if the PMV is not 0, the controller 120 may determine that a measured PMV value is the optimal PMV for the user. That is, the optimal PMV indicates a PMV value when a corresponding user feels most comfortable, and for example, may be 0 or level −1 or 1 may correspond to the optimal PMV. When the PMV is not 0, but the temperature of the air conditioner is not changed by the user for more than a predetermined time, the controller 120 may derive the corresponding measured PMV as the optimal PMV.

In addition, the controller 120 may calculate an optimal temperature by using the optimal PMV. Herein, the controller 120 may generate a learning model for deriving the optimal PMV through an AI neural network by learning temperature data and humidity data of a past predetermined period through the AI neural network, and may calculate an optimal temperature based on the optimal PMV derived by using the generated learning model. In this case, the AI neural network may use an AI neural network based on various AI techniques (for example, artificial neural network (ANN), support vector machine (SVM), relevance vector machine (RVM)) for learning data.

Specifically, when determination of occupancy and prediction of the optimal temperature are completed, the controller 120 may set a timer for 7 days, and may determine occupancy and predict an optima temperature every seven days. However, when the optimal temperature is predicted, the controller 120 may generate an initial PMV learning model, and then, to generate the next PMV learning mode, the controller 120 may extract the time that the user spends controlling the air conditioner for recent 7 days, in addition to temperature data, humidity data, and occupancy detection data which are used for 7 days for initial learning, and may continuously accumulate temperature data and humidity data of the corresponding time, and may update the PMV learning model. By doing so, the controller 120 may periodically update user's preferred temperature which is dynamically changeable, thereby enhancing the accuracy of prediction of an optimal temperature. In the above-described example, the period of seven days is merely an example, and the present disclosure may be implemented on a basis of other periods.

The controller 120 may extract temperature data, humidity data, and occupancy detection data of the past predetermined period (for example, 7 days) from the database server, first, to predict an optimal temperature, and may generate the optimal PMV learning model for each household by learning. When the user goes out, the temperature and humidity data does not reflect user's preference. Therefore, the controller 120 learns only temperature data and humidity data of the time that the occupancy data indicates the occupancy state, from among the temperature data and the humidity data of the past predetermined period (for example, 7 days), through the AI neural network. The controller 120 may use the AI neural network to learn the data, and the technique using the AI neural network is a method emulating the human brain, and refers to a method by which one neuron receives and processes information and, and transmits the information to the next neuron.

In addition, the controller 120 may derive an optimal PMV of a corresponding time with respect to an input of humidity through the PMV learning model generated through the AI neutral network, and may calculate an optimal temperature by putting the optimal PMV value derived by Equation 1 with the humidity data.

In addition, the controller 120 may convert time data regarding the temperature data and the humidity data of the past predetermined period from a scalar to a direction vector, and may use the time data as input data for the AI neural network. This will be described in more detail with reference to FIG. 6.

Figure 6:
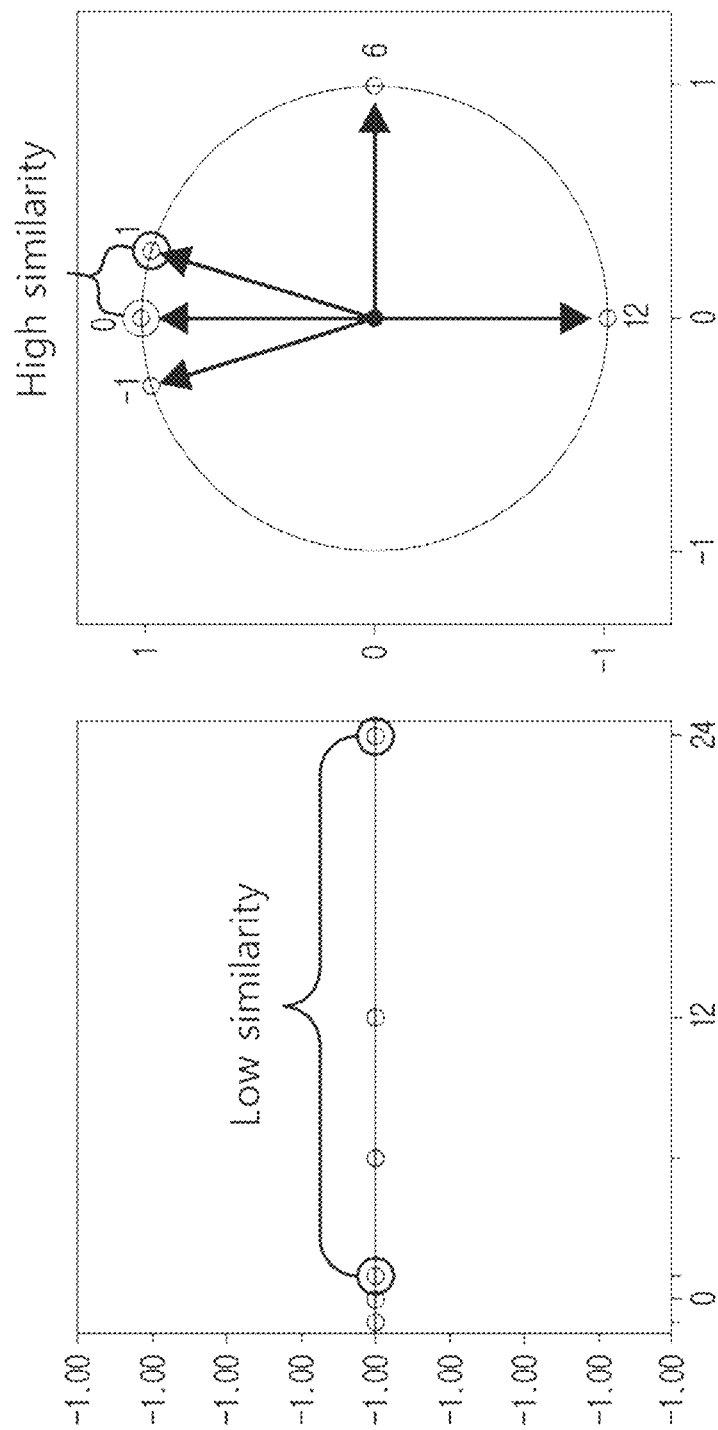
FIG. 6 is a graph illustrating a process of converting time data regarding temperature data and humidity data of a past predetermined period from a scalar into a direction vector according to an embodiment of the present disclosure.

FIG. 6 is a view illustrating graphs illustrating a process of converting time data regarding temperature data and humidity data of a past predetermined period from a scalar to a direction vector according to an embodiment. The left graph of FIG. 6 displays time data by a scalar, and the right graph of FIG. 6 illustrate time data converted into a direction vector.

There exists various optimizers and activation functions to train the AI neutral network. In the present embodiment, an Adam optimizer and an exponential linear unit (ELU) may be used. The controller 120 may perform data pre-processing to enhance the learning performance of the AI neural network, and as the data pre-processing, may convert the time data regarding the temperature data and the humidity data of the past predetermined period from the scalar into the direction vector, and may use the time data as input data for the AI neural network.

Since the time data is repeated on a 24-hour basis, there may be an error in expressing similarity between data when the data is displayed by the scalar. For example, data at 1 o'clock and data at 24 o'clock are data of a one-hour difference having high similarity, but, when the data is expressed by the scalar, the data may be determined to have low similarity as shown in the left graph of FIG. 6. On the other hand, when the time data is displayed by the direction vector, the data at 1 o'clock and the data at 24 o'clock are adjacent to each other, and there is high possibility that the data is determined to have high similarity. Accordingly, although the amount of data slightly increases during the process of converting into the direction vector, the controller 120 can minimize an error and enhance the performance.

Referring back to FIG. 1, the controller 120 may perform an interpolation process by removing an outlier from the temperature data and the humidity data. Herein, the outlier indicates a section in which data abruptly changes, and may be caused by various factors such as thermal noise of electronic equipment, an error during person's collecting, an error in a measuring process, an error in a network transmitting process, an error in a sampling process, etc.

The controller 120 may apply a method of using an average per unit time, or a method of measuring a slope of a graph every hour and removing data of greater than a specific slope in order to remove the outlier. The removal of the outlier will be described in detail with reference to FIG. 7.

Figure 7:
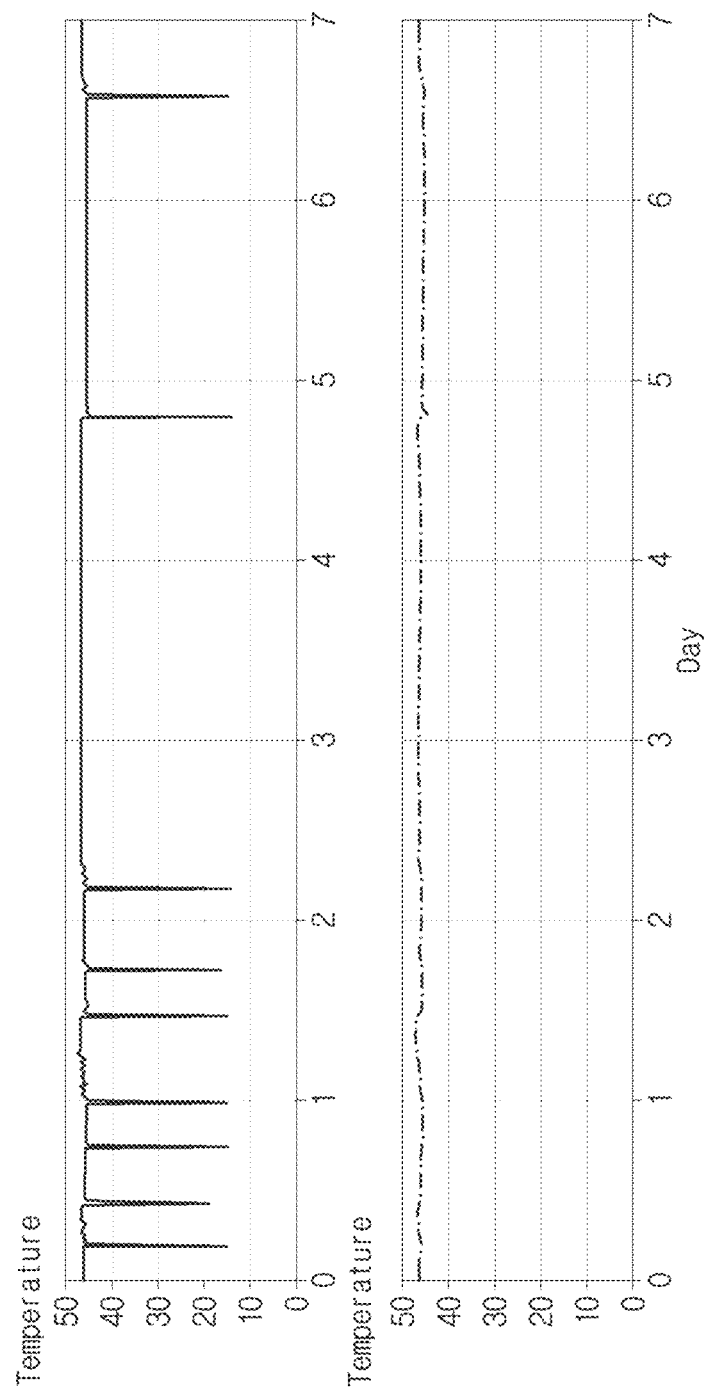
FIG. 7 is a graph to explain a process of removing an outlier of temperature data according to an embodiment of the present disclosure.

FIG. 7 is a view illustrating graphs to explain a process of removing an outlier of temperature data according to an embodiment. The upper graph of FIG. 7 illustrates temperature data before an outlier is removed, and the lower graph of FIG. 7 illustrates temperature data from which an outlier is removed. Compared to the upper graph of FIG. 7, the lower graph of FIG. 7 illustrates that some data has an empty space but there is no section in which a data value is abruptly changed.

To restore data lost in the outlier removing process, the controller 120 may perform an interpolation process with respect to the temperature data and the humidity data from which the outlier is removed. The interpolation will be described below with reference to FIGS. 8 and 9.

Figure 8:
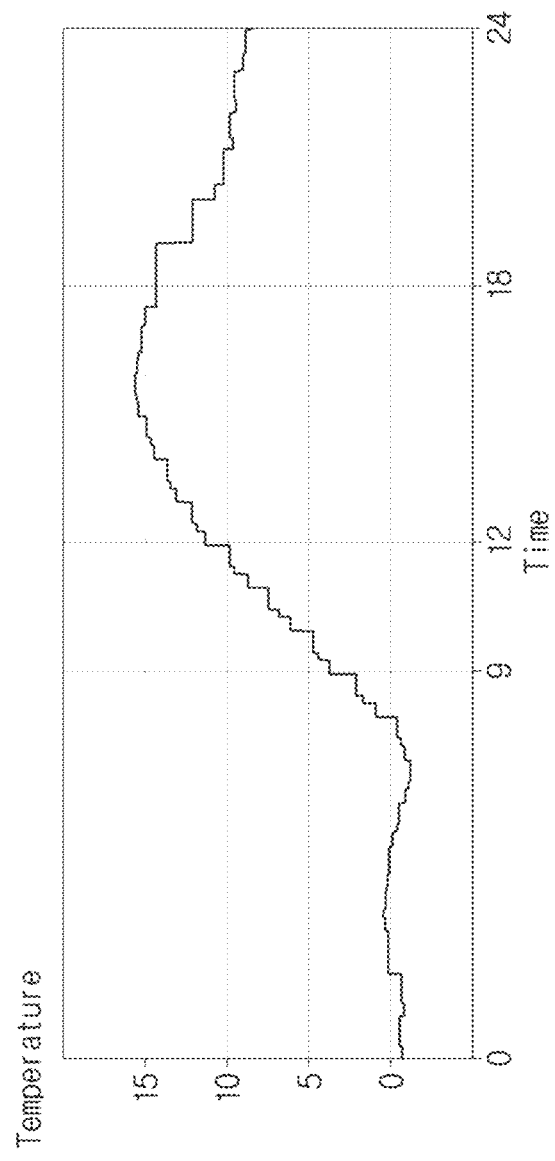
FIG. 8 is a graph illustrating temperature data before an interpolation is applied according to an embodiment of the present disclosure.
Figure 9:
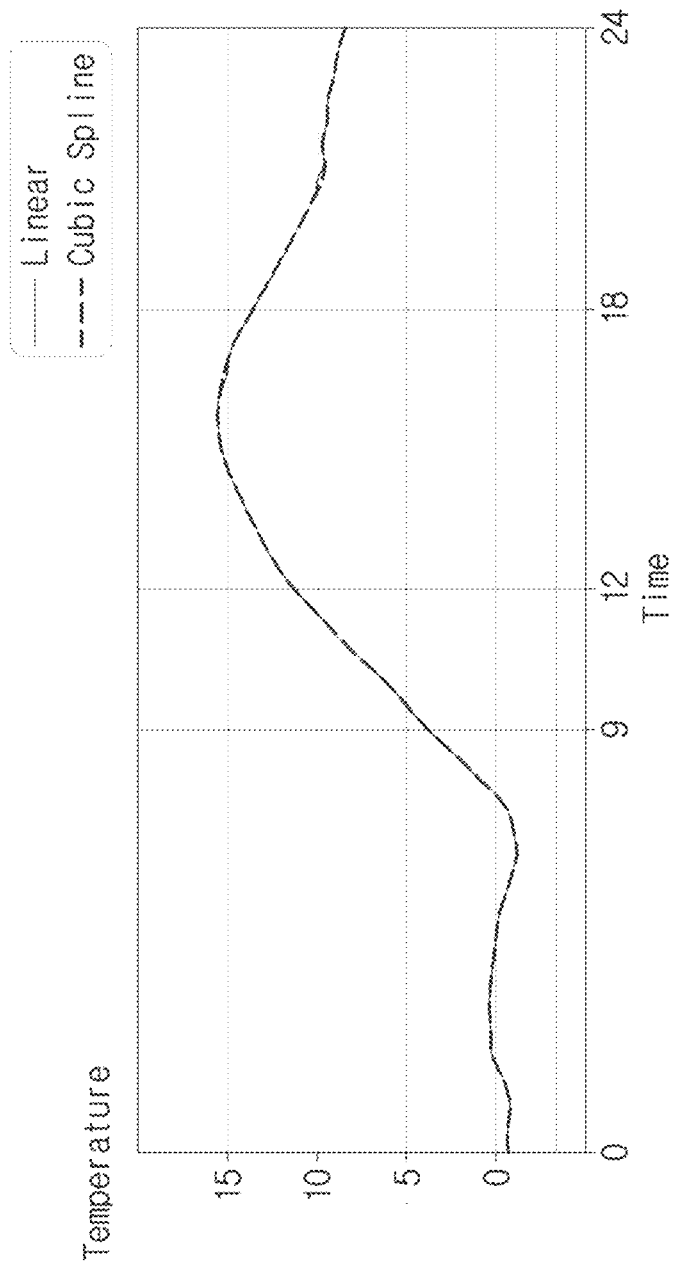
FIG. 9 is a graph illustrating temperature data after an interpolation is applied according to an embodiment of the present disclosure.

FIG. 8 is a graph illustrating temperature data before an interpolation is applied according to an embodiment, and FIG. 9 is a graph illustrating temperature data after an interpolation is applied according to an embodiment.

The controller 120 applies the interpolation to the temperature data and the humidity data from which the outlier is removed, in order to restore data lost by the removal of the outlier. The temperature data and the humidity data detected through the sensor unit 10 may have a temperature data value and a humidity data value of a specific time according to discrete time data. Such temperature data and humidity data may have equal time intervals, but may have unequal intervals or there may be no data. The interpolation is used to obtain continuous data or to restore lost data by using such data. The controller 120 may apply a linear interpolation method and a cubic spline interpolation method from among various interpolation methods.

The linear interpolation method is a method which linearly calculates values positioned between values of end points given according to a linear distance, and may expand adjacent function values $f(x_0)$ and $f(x_1)$ to interpolate a certain function $f(x)$ as shown in the following equation:

$$f(x) = f(x_0) + \frac{f(x_1) - f(x_0)}{x_1 - x_0}(x - x_0)$$

The cubic spline interpolation method is a method which uses a third-degree polynomial expression to estimate values between given points. In addition, the spline technique may be applied to reduce fluctuation occurring at end portions of data, and may reflect real data well. Before the interpolation is applied, the temperature data is expressed in a stepped graph due to the lack of data. However, when the interpolation is applied, empty data is estimated and the temperature data is expressed by a continuous temperature graph.

As described above, the controller 120 applies the interpolation to the temperature data and the humidity data from which the outlier is removed in order to restore the data lost by the removal of the outlier, and FIG. 8 is a graph of data before the interpolation is applied, and FIG. 9 is a graph of data after the interpolation is applied.

Through the above-described process, the controller 120 may derive the optimal PMV, may calculate the optimal temperature by using the optimal PMV, and may control the air conditioner based on the occupancy detection data, the future occupancy probability, and the optimal temperature.

The air conditioner automatic control apparatus 100 having the above-described configuration may predict future occupancy probability information, and may control the air conditioner to operate at the optimal temperature by using the temperature data and the humidity data.

Although FIG. 1 depicts that the air conditioner automatic control apparatus 100 is a separate apparatus from the sensor unit 10 and the air conditioner 20, this is merely an example, and the air conditioner automatic control apparatus 100 may be configured to include the sensor unit 10, or the air conditioner automatic control apparatus 100 and the sensor unit 10 may be configured to be included in the air conditioner 20.

When the air conditioner automatic control apparatus 100 and the sensor unit 10 are included in the air conditioner 20, the air conditioner 20 may include a sensor unit and a controller (corresponding to the air conditioner automatic control apparatus). In this case, the sensor unit may detect occupancy detection data indicating whether the user occupies the room, and may detect temperature data and humidity data indicating indoor temperature and humidity. In addition, the controller performs the functions of the air conditioner automatic control apparatus 100, and specifically, may predict future occupancy probability information of the user by using the occupancy detection data, may derive an optimal PMV by using temperature data and humidity data, and may calculate an optimal temperature by using the optimal PMV, and may control to operate based on the occupancy detection data, the future occupancy probability, and the optimal temperature.

As described above, the air conditioner automatic control apparatus 100 may be implemented to be included in the air conditioner 20.

Hereinafter, an air conditioner automatic control method will be described.

Figure 2:
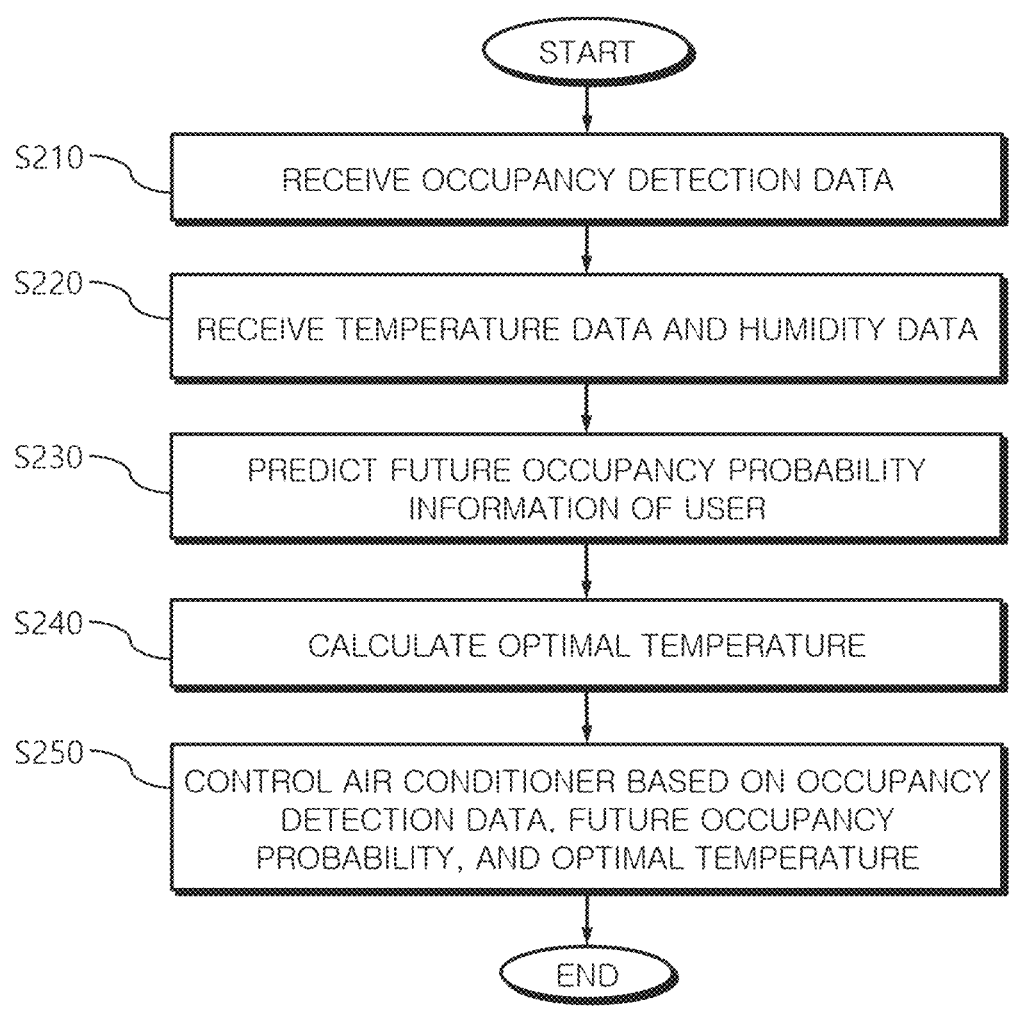
FIG. 2 is a flowchart provided to explain an air conditioner automatic control method according to an embodiment of the present disclosure.

FIG. 2 is a flowchart provided to explain an air conditioner automatic control method according to an embodiment.

First, the air conditioner automatic control apparatus 100 receives occupancy detection data indicating whether the user occupies the room (S210). In addition, the air conditioner automatic control apparatus 100 receives temperature data and humidity data indicating indoor temperature and humidity (S220).

In addition, the air conditioner automatic control apparatus 100 predicts future occupancy probability information of the user by using the occupancy detection data (S230). In this case, the air conditioner automatic control apparatus 100 may predict the future occupancy probability information by clustering corresponding occupancy detection data by days of the week and time by using occupancy detection data of a past predetermined period.

Thereafter, the air conditioner automatic control apparatus 100 derives an optimal PMV by using the temperature data and the humidity data, and calculates an optimal temperature by using the optimal PMV (S240). The air conditioner automatic control apparatus 100 generates a learning model for deriving the optimal PMV by learning the temperature data and the humidity data of the past predetermined period through an AI neutral network, and may calculate the optimal temperature based on the optimal PMV derived by using the generated learning model. In addition, the air conditioner automatic control apparatus 100 may learn only temperature data and humidity data of the time that the occupancy data indicates the occupancy state, from among the temperature data and the humidity data of the past predetermined period, through the AI neural network. In addition, the air conditioner automatic control apparatus 100 may convert time data regarding the temperature data and the humidity data of the past predetermined period from a scalar into a direction vector, and may use the time data as input data for the AI neural network.

Details of the above-described processes correspond to the operations of the controller 120 of the air conditioner automatic control apparatus 100 described above with reference to FIG. 1, and are the same as the operations of the controller 120 described above.

In addition, the air conditioner automatic control apparatus 100 controls the air conditioner based on the occupancy detection data, the future occupancy probability, and the optimal temperature (S250).

Figure 3:
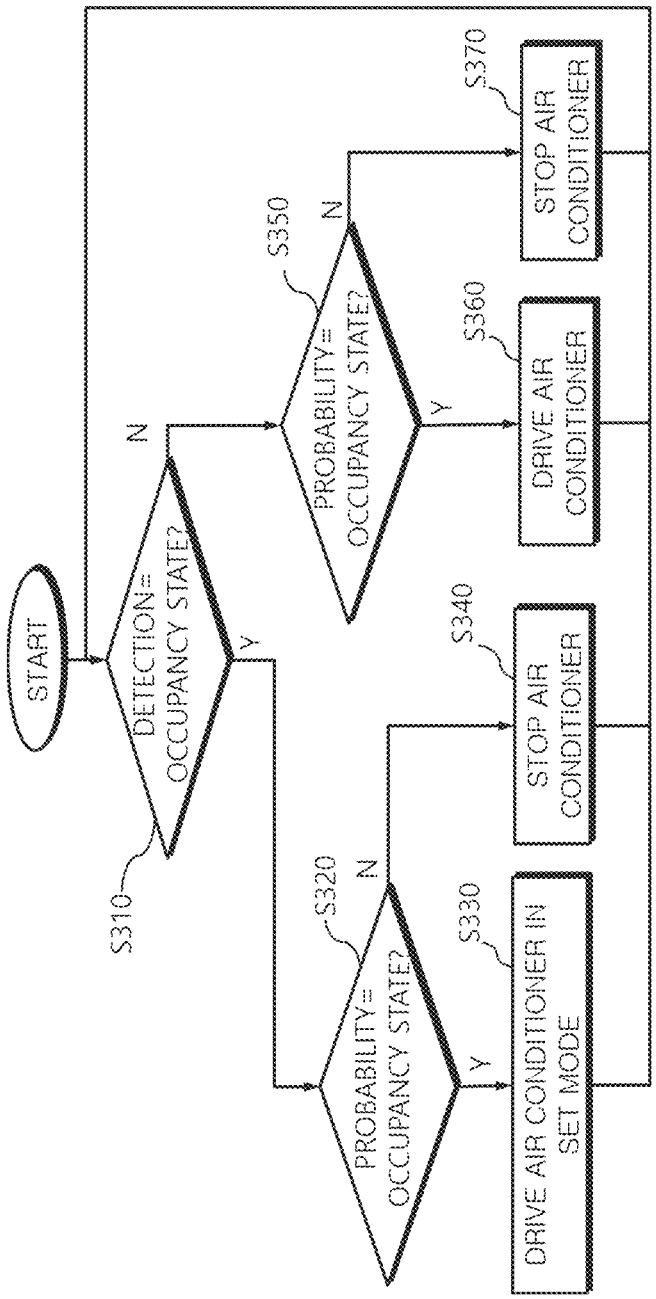
FIG. 3 is a flowchart provided to explain a method for automatically controlling an air conditioner according to occupancy detection data and future occupancy probability information according to an embodiment of the present disclosure.

The method for controlling the air conditioner will be described below in detail. FIG. 3 is a flowchart provided to explain a method for automatically controlling an air conditioner according to occupancy detection data and future occupancy probability information according to an embodiment.

First, the air conditioner automatic control apparatus 100 determines whether occupancy detection data indicates an occupancy state (S310). When the occupancy detection data indicates the occupancy state (S310-Y) and future occupancy probability information indicates an occupancy state after a predetermined time (S320-Y), the air conditioner automatic control apparatus 100 controls the operation of the air conditioner to be driven in a set mode (S330). An operation in each mode will be described below with reference to FIG. 4.

When the occupancy detection data indicates the occupancy state (S310-Y) and the future occupancy probability information indicates an inoccupancy state after a predetermined time (S320-N), the air conditioner automatic control apparatus 100 may control the operation of the air conditioner to be stopped (S340).

On the other hand, when the occupancy detection data indicates an inoccupancy state (S310-N) and the future occupancy probability information indicates an occupancy state after a predetermined time (S350-Y), the air conditioner automatic control apparatus 100 may control the operation of the air conditioner to be driven (S360), and, when the further occupancy probability information indicates an inoccupancy state after a predetermined time (S350-N), the air conditioner automatic control apparatus 100 may control the operation of the air conditioner to be stopped (S370).

As described above, the air conditioner automatic control apparatus 100 controls the operation of the air conditioner by using the occupancy detection data and the future occupancy probability information.

Figure 4:
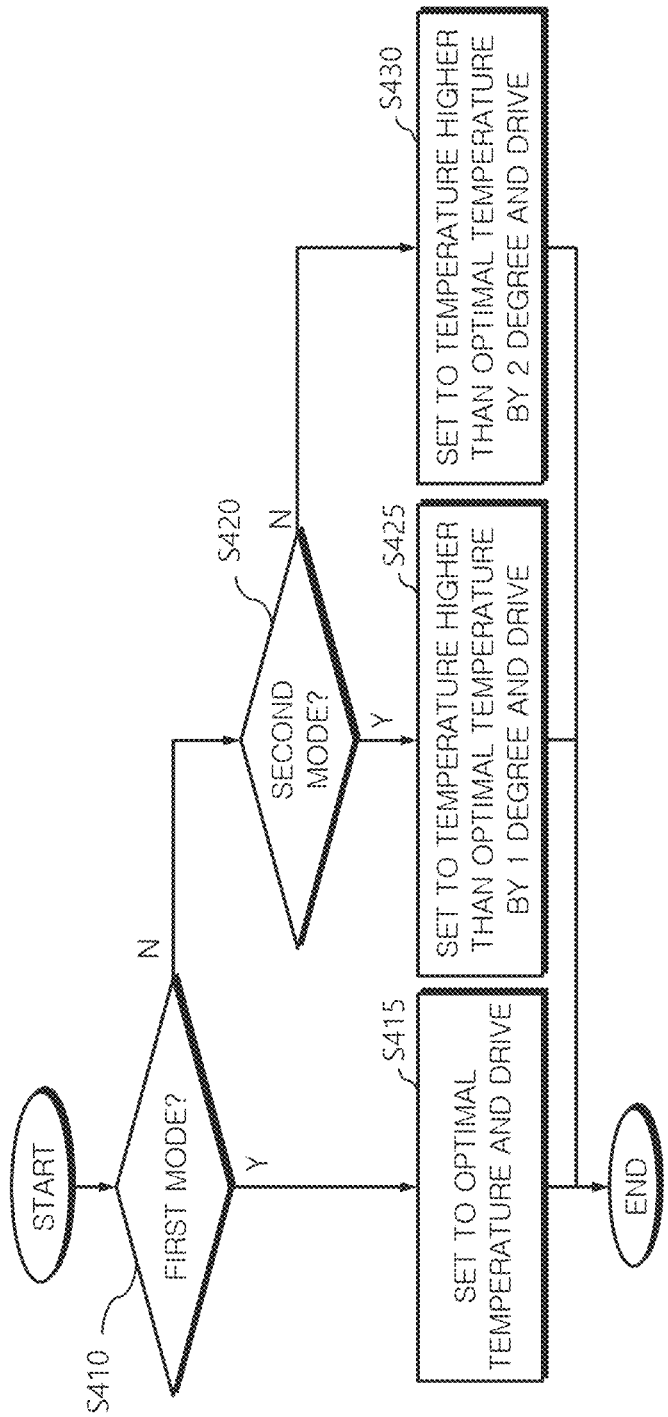
FIG. 4 is a flowchart provided to explain a method for automatically controlling an air conditioner according to a mode of the air conditioner according to an embodiment of the present disclosure.

FIG. 4 is a flowchart provided to explain an air conditioner automatic control method according to a mode of an air conditioner according to an embodiment.

First, the air conditioner automatic control apparatus 100 determines whether the mode of the air conditioner is a first mode (S410). When the air conditioner is set to the first mode (S410-Y), the air conditioner automatic control apparatus 100 may control the air conditioner to be set to an optimal temperature and to operate (S415).

On the other hand, when the air conditioner is set to a second mode (S420-Y), the air conditioner automatic control apparatus 100 may control the air conditioner to be set to a temperature higher than the optimal temperature by 1 degree, and to operate.

In addition, when the air conditioner is set to a third mode (S420-N), the air conditioner automatic control apparatus 100 may control the air conditioner to be set to a temperature higher than the optimal temperature by 2 degrees, and to operate.

Herein, the first mode may be referred to as a comport mode, the second mode may be referred to as a normal mode, and the third mode may be referred to as an economy mode.

Although the air conditioner automatic control apparatus 100 controls the air conditioner according to three modes in the present embodiment, this is merely an example, and the air conditioner automatic control apparatus 100 may control the air conditioner according to two or four or more modes, thereby controlling the air conditioner variably with reference to the optimal temperature.

Through the above-described process, the air conditioner automatic control apparatus 100 may control the air conditioner according to the tendency of the user.

Figure 5:
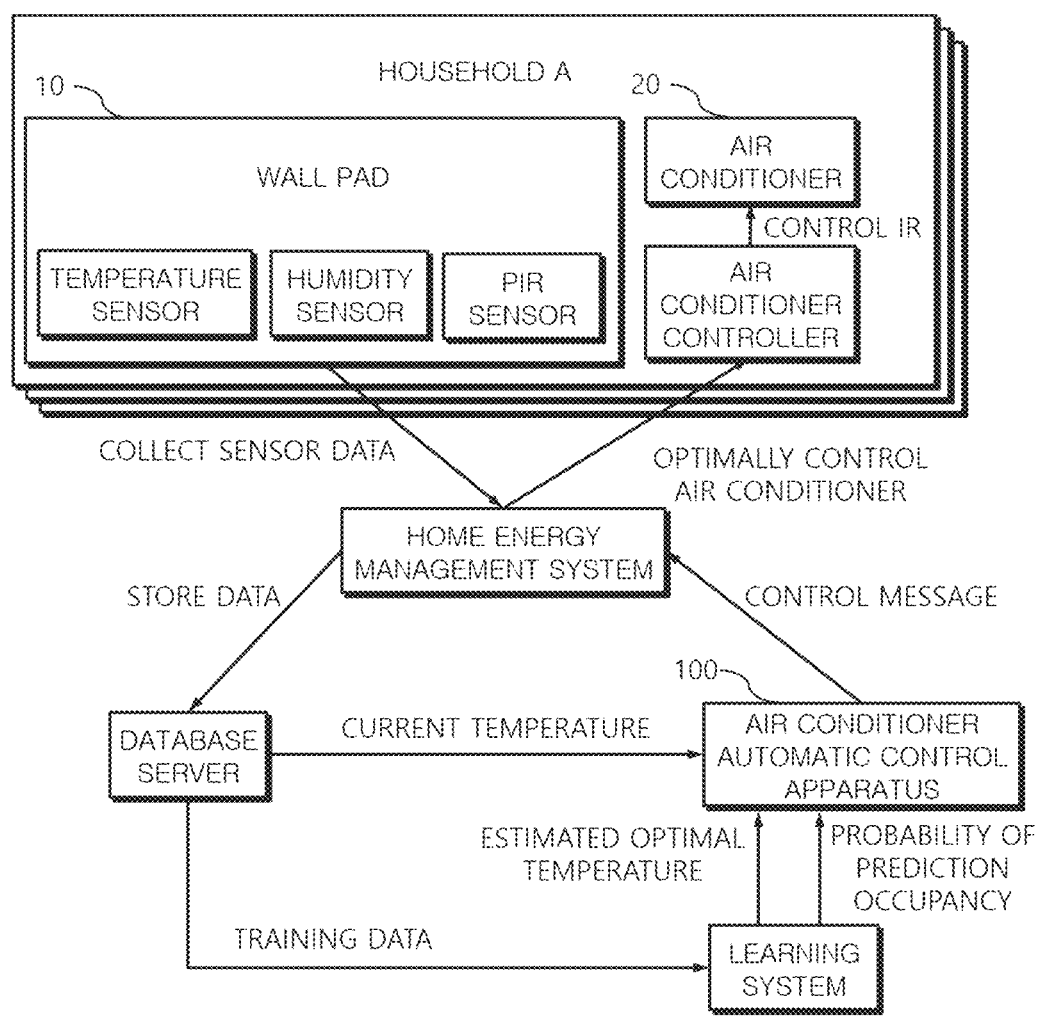
FIG. 5 is a view illustrating an example of an environment where an air conditioner automatic control apparatus is installed according to an embodiment of the present disclosure.

FIG. 5 is a view illustrating an example of an environment where the air conditioner automatic control apparatus is installed according to an embodiment.

Referring to FIG. 5, the air conditioner automatic control apparatus 100 controls an air conditioner 20 installed in a household A. In addition, a sensor unit 10 is included in a wall pad of the household A, and may include a temperature sensor, a humidity sensor, a passive infrared (PIR) sensor.

In the case of FIG. 5, it can be identified that the environment is controlled by a home energy management system (HEMS). The HEMS may collect data from sensors embedded in wall pads in respective households, and performs a role of controlling the air conditioner according to an optimal control message. Sensor data includes temperature data, humidity data, and PIR data (occupancy detection data) of the respective households necessary for learning an optimal temperature.

An air conditioner controller may convert the optimal control message received from the HEMS into an IR signal, and may directly control the air conditioner, or, when a user sets a temperature of the air conditioner by using a remote controller (user intervention), the air conditioner controller may sniff the IR signal of the remote controller and may transmit a user intervention message to the HEMS.

A database server performs a role of storing sensor data collected from each household. The collected/stored data may be used for learning an optimal temperature by the air conditioner control system.

A learning system may learn an optimal temperature according to a learning command of the air conditioner control system.

The air conditioner automatic control apparatus 100 may obtain training data from the database server, and may transmit an air conditioner control message to the HEMS based on an optimal temperature derived by the learning system, thereby controlling temperature of the air conditioner.

In such an environment, the air conditioner automatic control apparatus 100 can control the air conditioner 20 at the optimal temperature preferred by the user.

The technical idea of the present disclosure may be applied to a computer-readable recording medium which records a computer program for performing the function and the method of the apparatus according to the present embodiments. In addition, the technical idea according to various embodiments of the present disclosure may be implemented in the form of a programming language code recorded on the computer-readable recording medium and readable by a computer. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, a flash memory, a solid state disk (SSD), or the like. A code or program that is stored in the computer readable recording medium and readable by a computer may be transmitted via a network connected between computers.

Although the detailed description and drawings describe a configuration of an exemplary device, an implemented thing of an functional operation and a subject explained in the detailed description may be implemented by different types of digital electronic circuits, or may be implemented by computer software, firmware, or hardware including the structure disclosed in the detailed description and a structural equivalent thereto, or may be implemented by a combination of one or more of computer software, firmware, or hardware.

Accordingly, while exemplary embodiments have been particularly shown and described above, it will be understood by those of ordinary skill in the art that various changes in form and details may be made therein without departing from the spirit and scope.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A method for automatically controlling an air conditioner by an air conditioner automatic control apparatus, the method comprising:
   receiving occupancy detection data indicating whether a user occupies a room;
   receiving temperature data and humidity data indicating indoor temperature and humidity;
   predicting future occupancy probability information of the user by using the occupancy detection data;
   deriving an optimal Predicted Mean Vote (PMV) by using the temperature data and the humidity data, and calculating an optimal temperature by using the optimal PMV; and
   controlling the air conditioner based on the occupancy detection data, the occupancy probability, and the optimal temperature,
   wherein the controlling comprises:
     when the occupancy detection data indicates an inoccupancy state and the future occupancy probability information indicates an occupancy state after a predetermined time, controlling an operation of the air conditioner to be driven; and
     when the future occupancy probability information indicates an inoccupancy state after a predetermined time, controlling the operation of the air conditioner to be stopped,
   wherein the calculating the optimal temperature comprises generating a learning model for deriving an optimal PMV by learning temperature data and humidity data of a past predetermined period through an AI neutral network, and calculating the optimal temperature based on the optimal PMV derived by using the generated learning model.

2. The method of claim 1, wherein the controlling comprises, when the occupancy detection data indicates an occupancy state and the future occupancy probability information indicates an inoccupancy state after a predetermined time, controlling an operation of the air conditioner to be stopped.

3. The method of claim 1, wherein the controlling comprises, when the occupancy detection data indicates an occupancy state and the future occupancy probability information indicates an occupancy state after a predetermined time, controlling an operation of the air conditioner to be driven.

4. The method of claim 3, wherein the controlling comprises: when the air conditioner is set to a first mode, controlling the air conditioner be set to the optimal temperature and to operate; when the air conditioner is set to a second mode, controlling the air conditioner to be set to a temperature higher than the optimal temperature by 1 degree, and to operate; and when the air conditioner is set to a third mode, controlling the air conditioner to be set to a temperature higher than the optimal temperature by 2 degrees, and to operate.

5. The method of claim 1, wherein the predicting comprises predicting the future occupancy probability information by clustering corresponding occupancy detection data by days of the week and time by using occupancy detection data of a past predetermined period.

6. The method of claim 1, wherein the calculating the optimal temperature comprises learning only temperature data and humidity data of the time that the occupancy detection data indicates an occupancy state, from among the temperature data and the humidity data of the past predetermined period, through the AI neural network.

7. The method of claim 1, wherein the calculating the optimal temperature comprises converting time data regarding the temperature data and the humidity data of the past predetermined period from a scalar into a direction vector, and using the time data as input data for the AI neural network.

8. A non-transitory computer-readable recording medium which has a computer program recorded thereon, the computer program performing a method for automatically controlling an air conditioner by an air conditioner automatic control apparatus, the method comprising:
  receiving occupancy detection data indicating whether a user occupies a room;
  receiving temperature data and humidity data indicating indoor temperature and humidity;
  predicting future occupancy probability information of the user by using the occupancy detection data;
  deriving an optimal Predicted Mean Vote (PMV) by using the temperature data and the humidity data, and calculating an optimal temperature by using the optimal PMV; and
  controlling the air conditioner based on the occupancy detection data, the future occupancy probability, and the optimal temperature,
  wherein the controlling comprises:
    when the occupancy detection data indicates an inoccupancy state and the future occupancy probability information indicates an occupancy state after a predetermined time, controlling an operation of the air conditioner to be driven; and
    when the future occupancy probability information indicates an inoccupancy state after a predetermined time, controlling the operation of the air conditioner to be stopped,
  wherein the calculating the optimal temperature comprises generating a learning model for deriving an optimal PMV by learning temperature data and humidity data of a past predetermined period through an AI neutral network, and calculating the optimal temperature based on the optimal PMV derived by using the generated learning model.

9. An air conditioner automatic control apparatus comprising:
  a communication unit configured to receive occupancy detection data indicating whether a user occupies a room, and to receive temperature data and humidity data indicating indoor temperature and humidity; and
  a controller configured to predict future occupancy probability information of the user by using the occupancy detection data, to derive an optimal Predicted Mean Vote (PMV) by using the temperature data and the humidity data, to calculate an optimal temperature by using the optimal PMV, and to control an air conditioner based on the occupancy detection data, the future occupancy probability, and the optimal temperature,
  wherein,
    when the occupancy detection data indicates an inoccupancy state and the future occupancy probability information indicates an occupancy state after a predetermined time, the controller is configured to control an operation of the air conditioner to be driven, and
    when the future occupancy probability information indicates an inoccupancy state after a predetermined time, the controller is configured to control the operation of the air conditioner to be stopped,
  wherein the controller is configured to generate a learning model for deriving an optimal PMV by learning temperature data and humidity data of a past predetermined period through an AI neutral network, and calculate the optimal temperature based on the optimal PMV derived by using the generated learning model.

* * * * *